(12) United States Patent
Matsuda

(10) Patent No.: US 8,014,074 B2
(45) Date of Patent: Sep. 6, 2011

(54) FINDER OPTICAL SYSTEM AND IMAGE PICKUP APPARATUS USING THE SAME

(75) Inventor: Takaho Matsuda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 12/437,558

(22) Filed: May 8, 2009

(65) Prior Publication Data

US 2009/0279182 A1    Nov. 12, 2009

(30) Foreign Application Priority Data

May 9, 2008   (JP) ................................ 2008-122934

(51) Int. Cl.
*G02B 25/00*   (2006.01)
(52) U.S. Cl. ...................................................... 359/645
(58) Field of Classification Search .................. 359/645, 359/676, 684
See application file for complete search history.

(56) References Cited

FOREIGN PATENT DOCUMENTS

| JP | 09-189868 | * | 7/1997 |
|---|---|---|---|
| JP | H9-329752 A | | 12/1997 |
| JP | 2000-111810 A | | 4/2000 |
| JP | 2003-215471 A | | 7/2003 |
| JP | 2005-284039 A | | 10/2005 |
| JP | 2006-145834 A | | 6/2006 |

\* cited by examiner

*Primary Examiner* — Joseph Martinez
(74) *Attorney, Agent, or Firm* — Canon U.S.A., Inc., IP Division

(57) ABSTRACT

A finder optical system includes an image taking lens configured to form a photogenic subject image, an erecting image forming member configured to convert the photogenic subject image an erecting image, and an ocular lens configured to enable observation the erecting image of the photogenic subject image therethrough, wherein the ocular lens includes, in an order from the erecting image forming member to the observation side, a first lens group of negative refracting power, a second lens group of positive refracting power and configured to move in an optical axis direction to perform diopter adjustment, and a third lens group having at least one positive lens and at least one negative lens and having a positive or negative overall refracting power, and wherein, when a focal length of the whole system as the ocular lens is at −1 diopter is denoted by f, a composite focal length of the negative lens or lenses of the third lens group is denoted by f3n, a conditional expression $$-0.55 < f3n/f < -0.30$$

is satisfied.

7 Claims, 10 Drawing Sheets

FINDER OPTICAL SYSTEM AND IMAGE PICKUP APPARATUS USING THE SAME

FIELD OF THE INVENTION AND RELATED ART

This invention relates to a finder optical system and an image pickup apparatus using the same. The present invention is particularly suitably applicable to an image pickup apparatus such as a single lens reflex camera, for example, to assure a large observation magnification of a finder optical system so that a finder image can be observed well.

In single lens reflex cameras, a photogenic subject image (finder image) which is formed on a focusing glass by an image taking lens is observed through a finder optical system. This finder optical system is configured so that a photogenic subject image formed on the focusing glass is converted into an erecting image through an image inversion means such as a penta prism, and it is enlarged by an ocular lens (eyepiece) for observation.

In the finder optical system of a single lens reflex camera, the specifications of the finder such as the observation magnification or the eye relief are determined mainly in accordance with the optical path length from the focusing glass to an ocular lens which depends on the dimension of the penta roof prism. Here, the eye relief is the distance from the exit surface of the ocular lens to the pupil (eye point) of the observer.

The ocular lens used for a finder optical system of a single lens reflex camera is required to provide a large observation magnification, an eye relief of sufficient length and a diopter adjusting function, for example.

Generally, in order to enlarge the observation magnification of the finder optical system, it is necessary to shorten the focal length of the ocular lens. However, in the finder optical system of the single lens reflex camera, the diopter of the ocular lens should be set at around −1 diopter. Therefore, the substantial focal length of the ocular lens is determined by the distance to the ocular lens from the focusing glass on which a photogenic subject image is formed (i.e., the optical path length to the principal point position of the ocular lens).

Furthermore, in order to assure a sufficient eye relief length, the penta roof prism has to be made sufficiently large to reduce the eclipse of light beams by the penta roof prism as much as possible.

However, in that occasion, the optical path length from the focusing glass to the ocular lens is necessarily lengthened, and the observation magnification of the finder optical system is diminished.

As described above, in the finder optical system of a single lens reflex camera, it is very difficult to set a sufficiently long eye relief while making the observation magnification of the finder optical system large.

Thus, in order to enlarge the observation magnification of the finder optical system in a most simple way, the optical path length of the penta roof prism may be shortened and the ocular lens may be placed close to the penta prism.

With such configuration, however, the observation unit (eye point) of the finder optical system moves toward the object side from the rear face of the camera, and the eye relief shortens undesirably.

In order to lengthen the eye relief in the single lens reflex camera while assuring a large observation magnification of the finder optical system, since the dimension (optical path length) of the penta roof prism cannot be made so small, it is very important to appropriately set the lens structure of the ocular lens.

If the lens structure of the ocular lens is inappropriate, it becomes very difficult to lengthen the eye relief while making the observation magnification large.

SUMMARY OF THE INVENTION

The present invention provides a finder optical system by which at least one of the inconveniences described above can be avoided or reduced.

Specifically, in accordance with an aspect of the present invention, there is provided a finder optical system comprising: an image taking lens configured to form a photogenic subject image; an erecting image forming member configured to convert the photogenic subject image an erecting image, and an ocular lens configured to enable observation the erecting image of the photogenic subject image therethrough, wherein said ocular lens includes, in an order from said erecting image forming member to the observation side, a first lens group of negative refracting power, a second lens group of positive refracting power and configured to move in an optical axis direction to perform diopter adjustment, and a third lens group having at least one positive lens and at least one negative lens and having a positive or negative overall refracting power, and wherein, when a focal length of the whole system as said ocular lens is at −1 diopter is denoted by f, a composite focal length of the negative lens or lenses of said third lens group is denoted by f3$n$, a conditional expression $$-0.55 < f3n/f < -0.30$$

is satisfied.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of a finder optical system and an image pickup apparatus having the same according to the present invention will now be described with reference to the attached drawings.

A finder optical system according to the present invention is configured so that a photogenic subject image formed on the focusing glass is converted into an erecting image through an erecting image forming member (image inversion means) such as a penta roof prism or the like, and this erecting image is observed through an ocular lens.

The ocular lens has a structure in an order from the erecting image forming member to the observation side, as follows. That is, is comprises a first lens group of negative refracting power, a second lens group of positive refracting power configured to perform diopter adjustment as it moves in an optical axis direction, and a third lens group including one or more positive lenses and one or more negative lenses and having a positive or negative overall refracting power.

Figure 1:
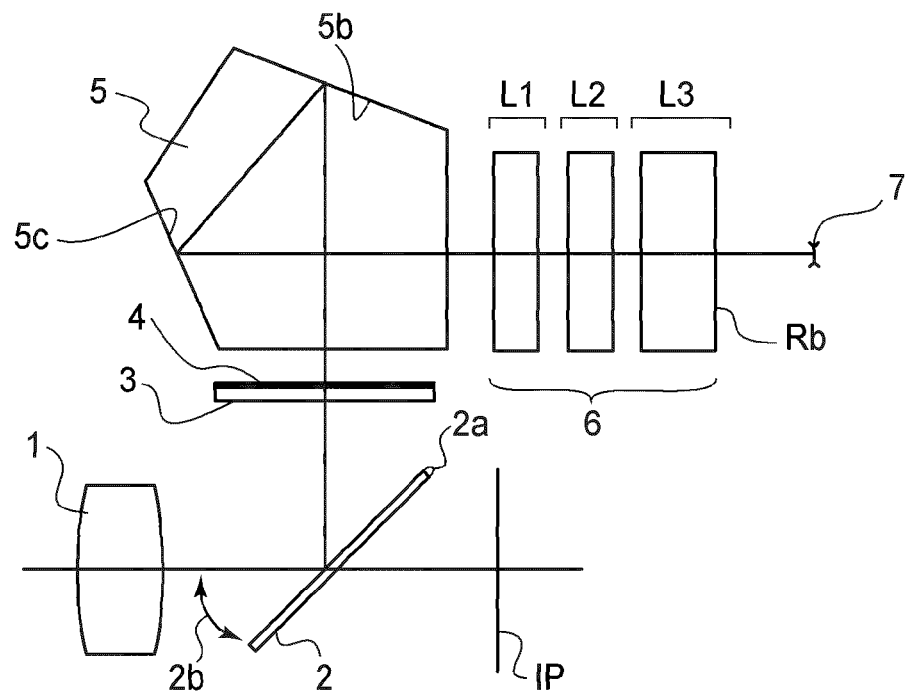
FIG. 1 is a sectional view of a main portion of an image pickup apparatus using a finder optical system according to the present invention.

FIG. 1 is a sectional view of a main portion when a finder optical system according to the present invention is applied to a digital single lens reflex camera as an image pickup apparatus.

Figure 2:
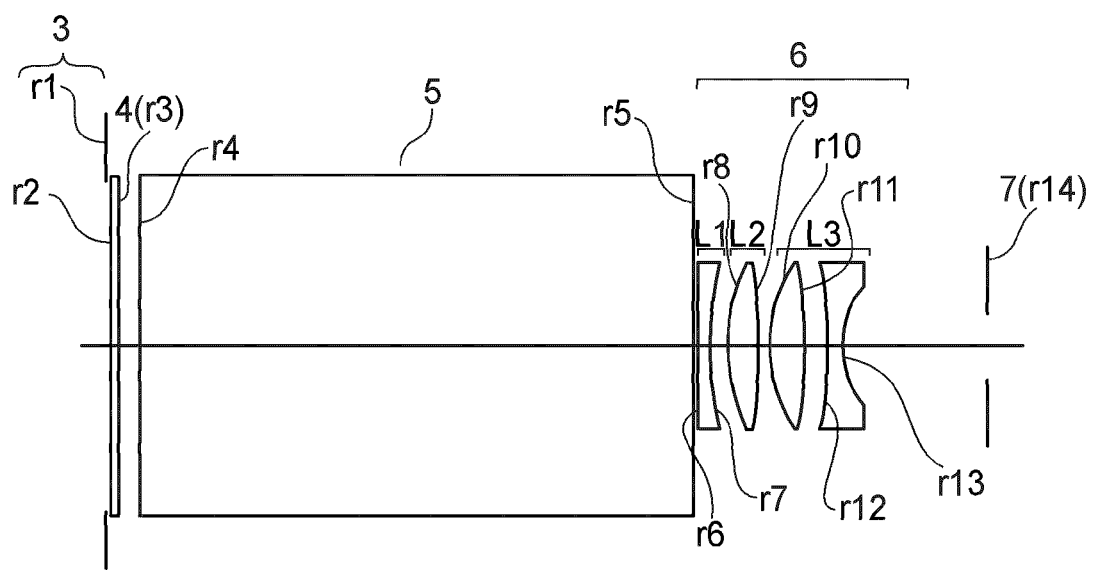
FIG. 2 is a sectional view illustrating developed light paths of Numerical Example 1 of the present invention.
Figure 3:
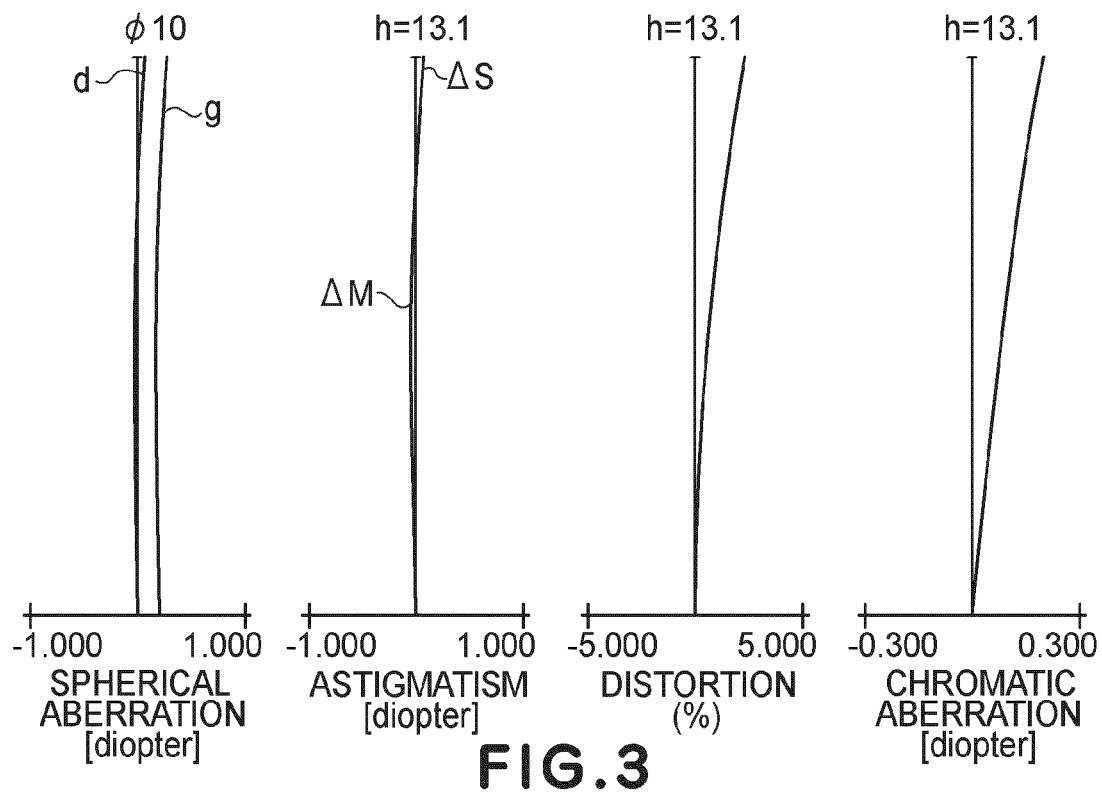
FIG. 3 is an aberration diagram of Numerical Example 1 of the present invention.

FIG. 2 and FIG. 3 are a developed light path diagram and an aberration diagram, respectively, of a finder optical system according to Embodiment 1 of the present invention.

Figure 4:
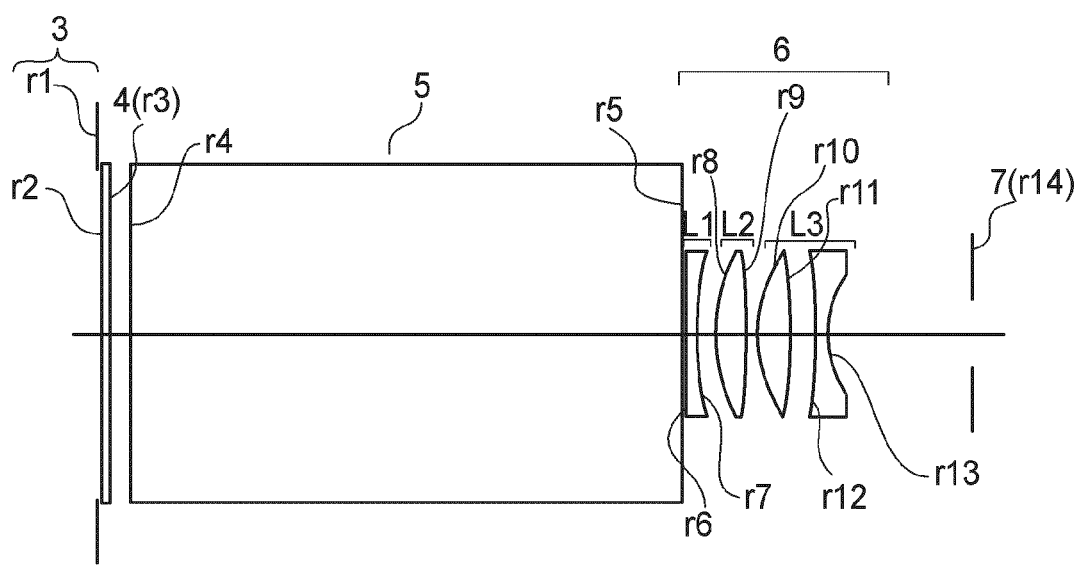
FIG. 4 is a sectional view illustrating developed light paths of Numerical Example 2 of the present invention.
Figure 5:
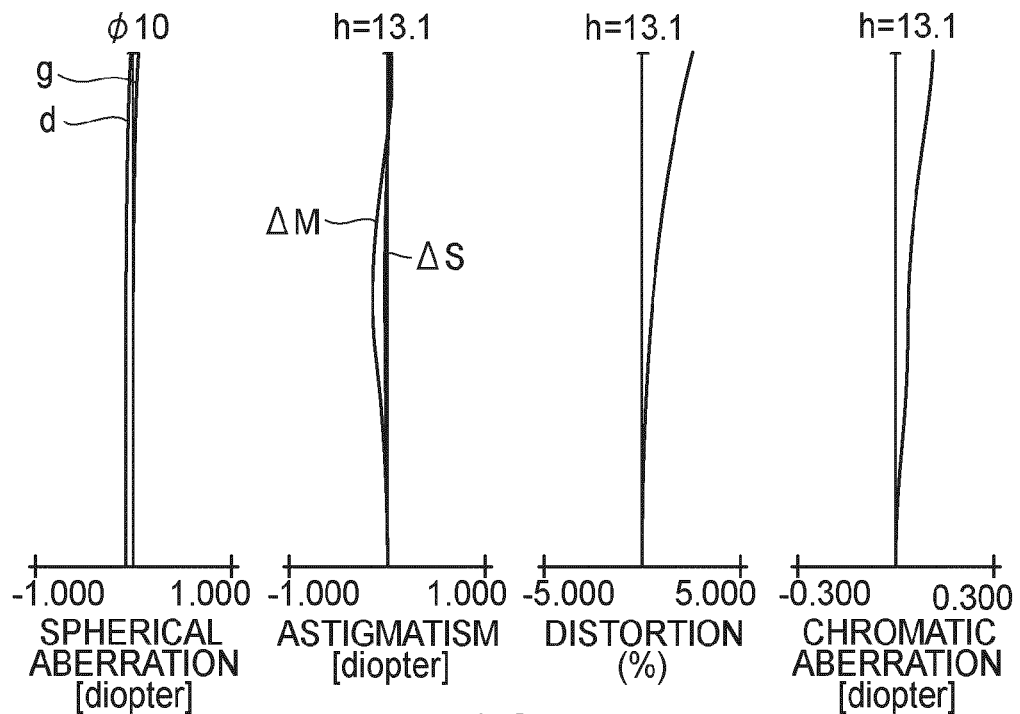
FIG. 5 is an aberration diagram of Numerical Example 2 of the present invention.

FIG. 4 and FIG. 5 are a developed light path diagram and an aberration diagram, respectively, of a finder optical system according to Embodiment 2 of the present invention.

Figure 6:
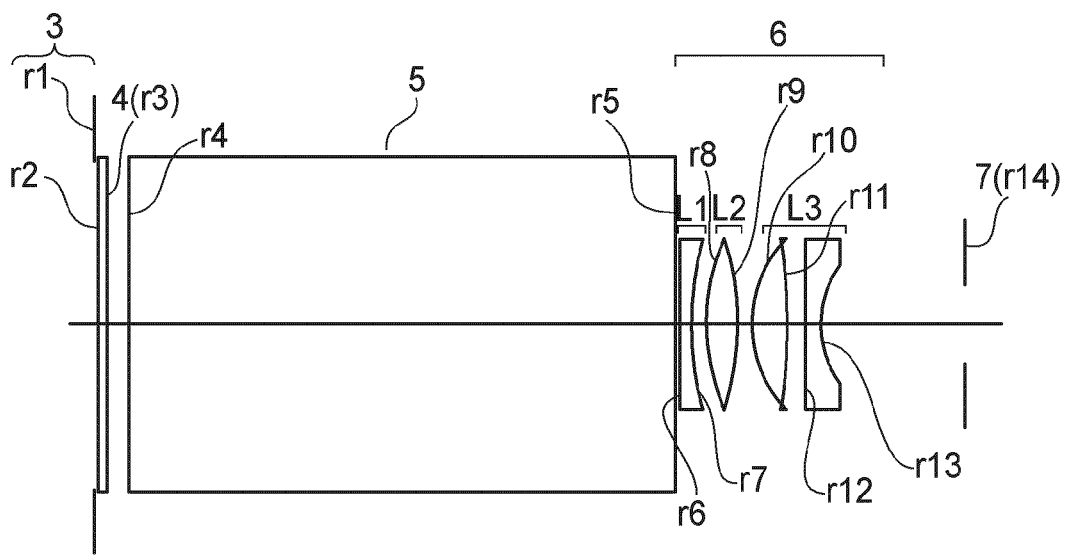
FIG. 6 is a sectional view illustrating developed light paths of Numerical Example 3 of the present invention.
Figure 7:
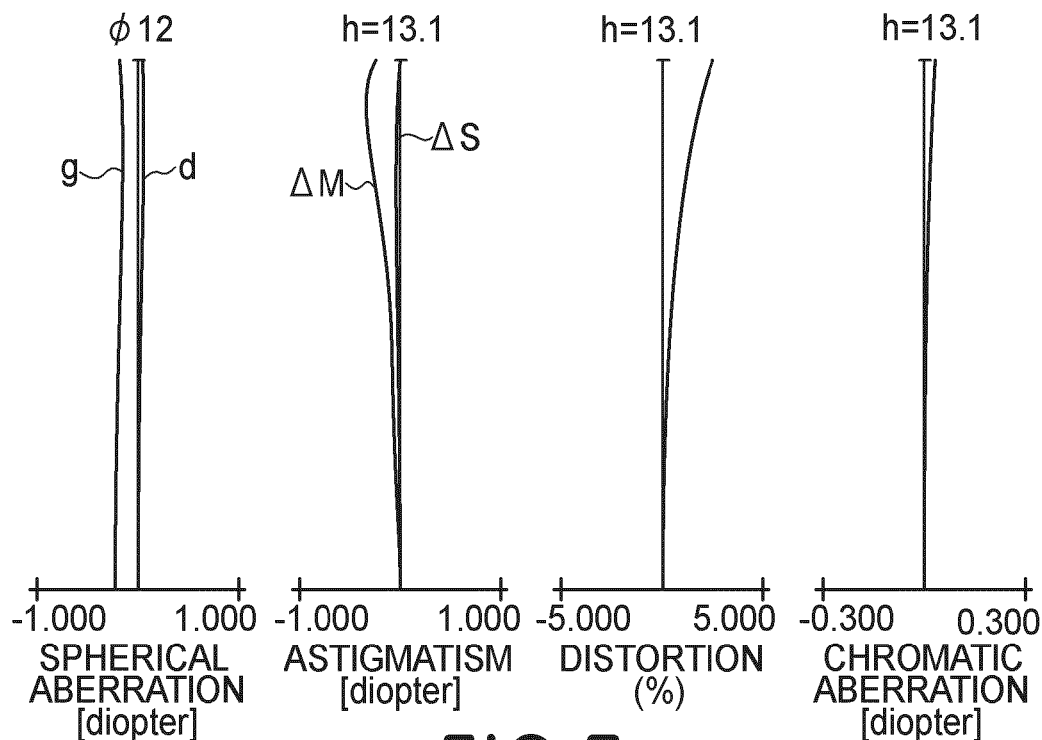
FIG. 7 is an aberration diagram of Numerical Example 3 of the present invention.

FIG. 6 and FIG. 7 are a developed light path diagram and an aberration diagram, respectively, of a finder optical system according to Embodiment 3 of the present invention.

Figure 8:
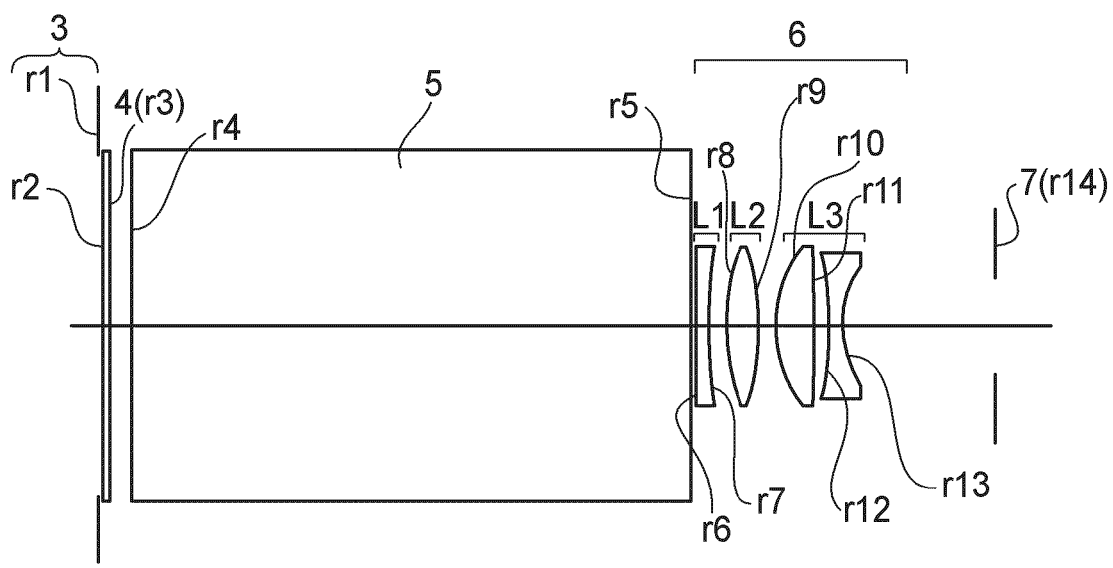
FIG. 8 is a sectional view illustrating developed light paths of Numerical Example 4 of the present invention.
Figure 9:
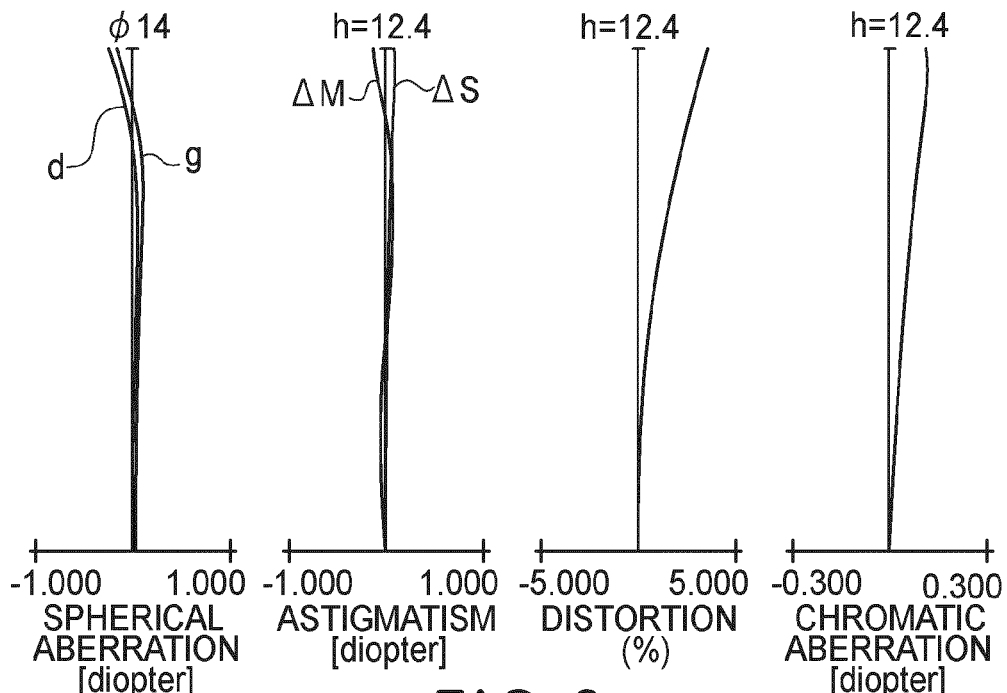
FIG. 9 is an aberration diagram of Numerical Example 4 of the present invention.

FIG. 8 and FIG. 9 are a developed light path diagram and an aberration diagram, respectively, of a finder optical system according to Embodiment 4 of the present invention.

Figure 10:
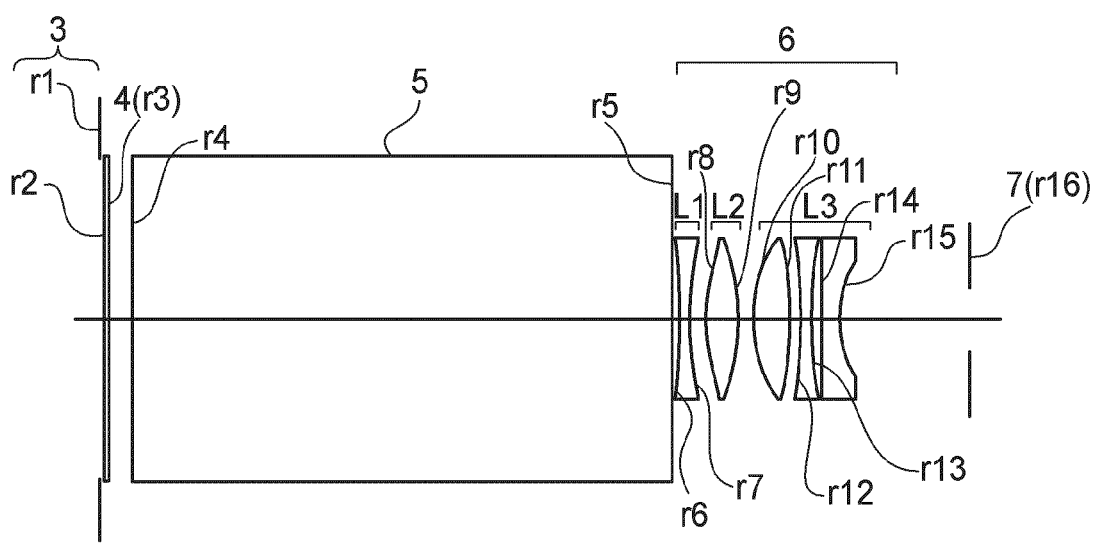
FIG. 10 is a sectional view illustrating developed light paths of Numerical Example 5 of the present invention.
Figure 11:
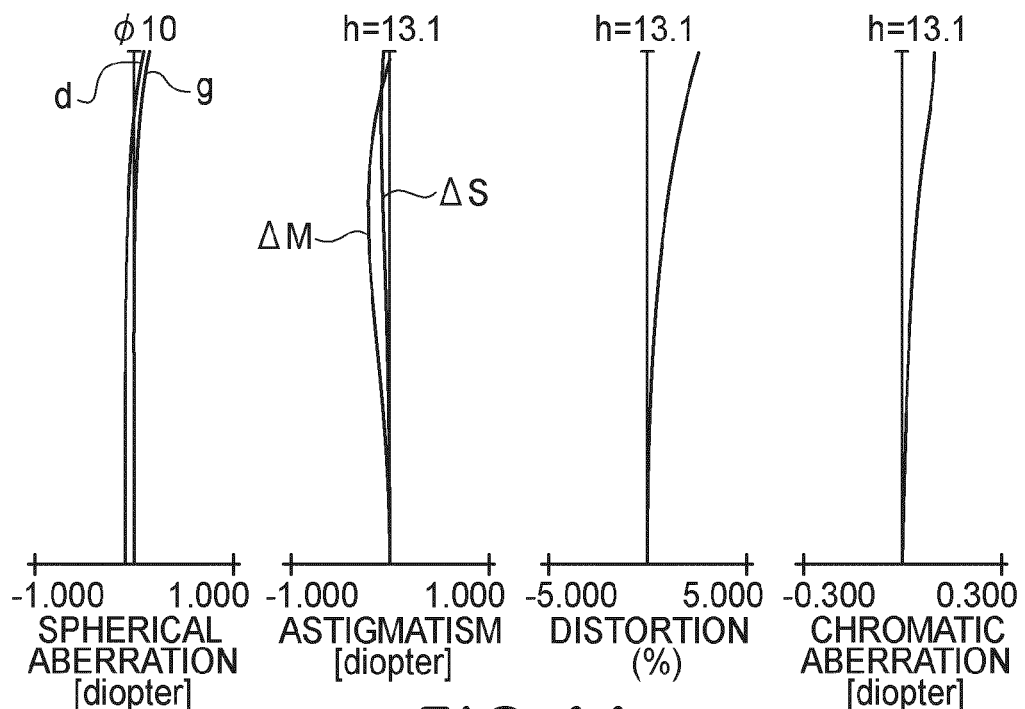
FIG. 11 is an aberration diagram of Numerical Example 5 of the present invention.

FIG. 10 and FIG. 11 are a developed light path diagram and an aberration diagram, respectively, of a finder optical system according to Embodiment 5 of the present invention.

Figure 12:
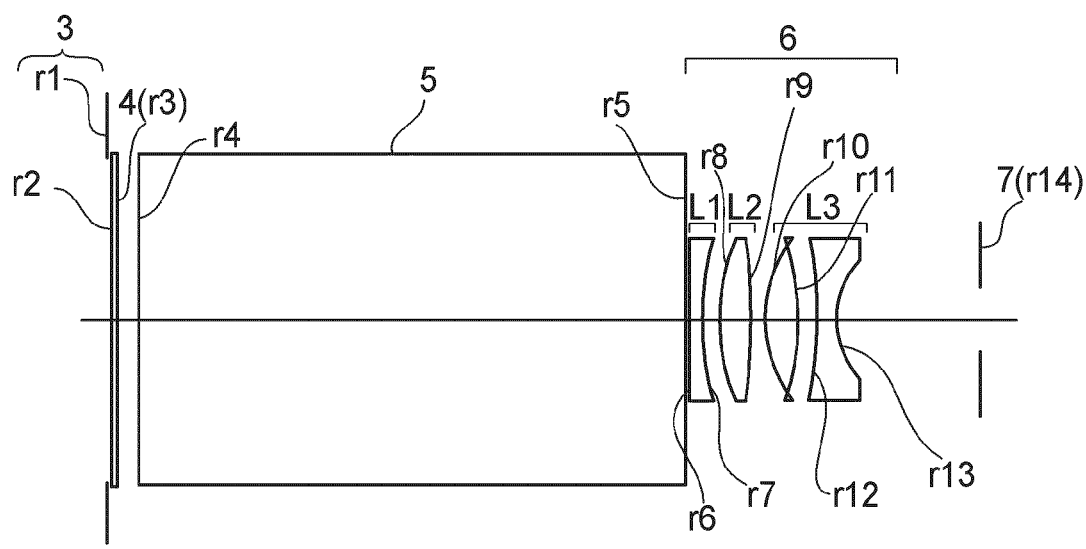
FIG. 12 is a sectional view illustrating developed light paths of Numerical Example 6 of the present invention.
Figure 13:
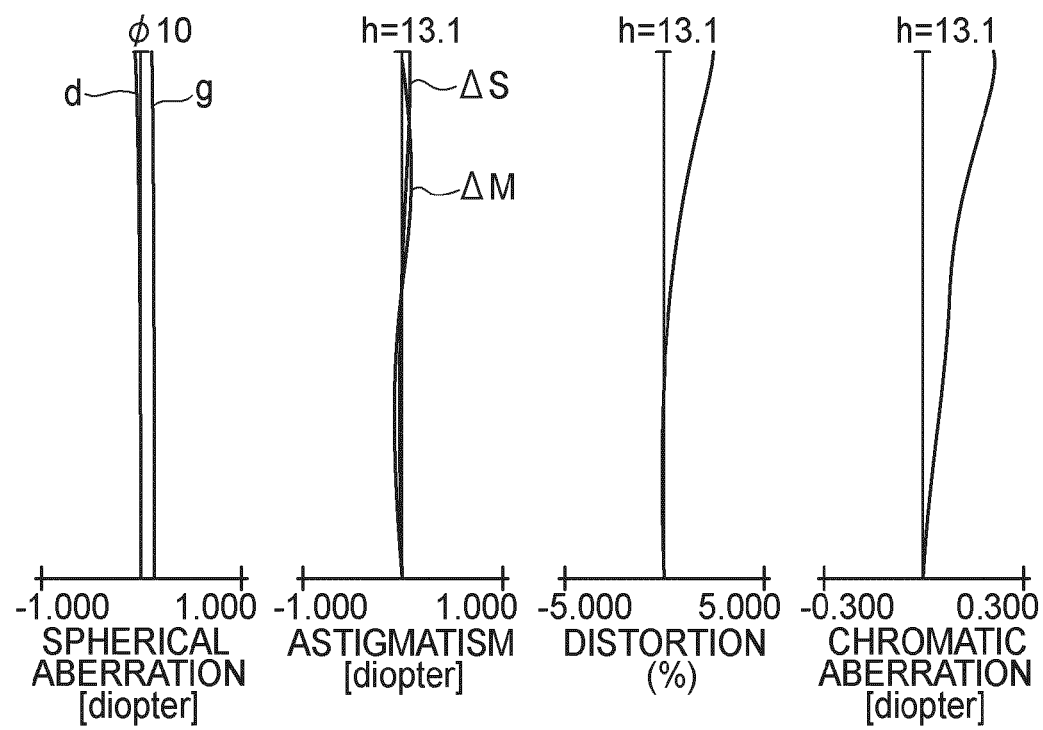
FIG. 13 is an aberration diagram of Numerical Example 6 of the present invention.

FIG. 12 and FIG. 13 are a developed light path diagram and an aberration diagram, respectively, of a finder optical system according to Embodiment 6 of the present invention.

Figure 14:
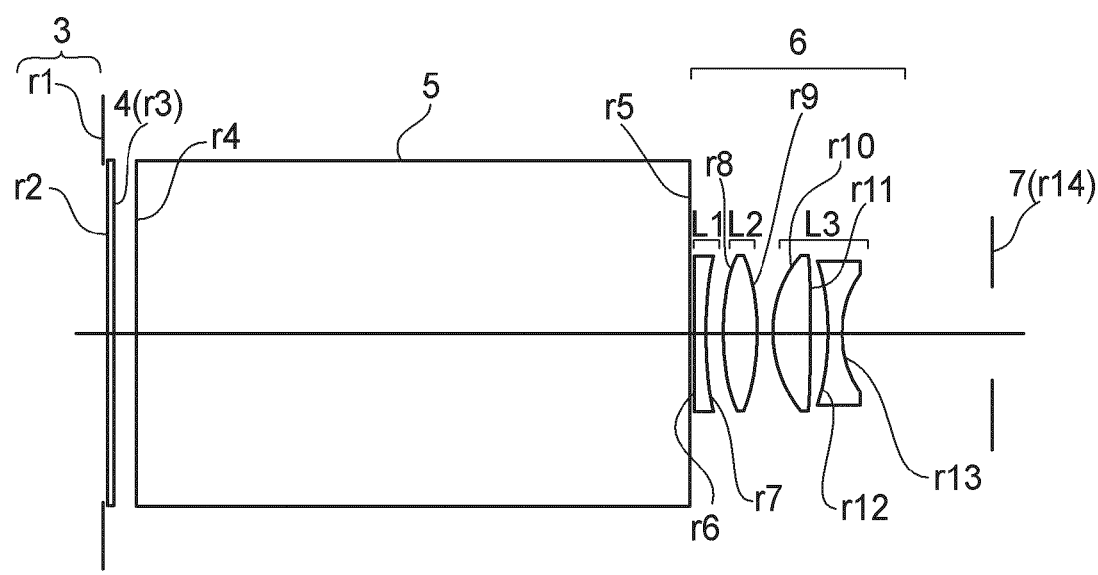
FIG. 14 is a sectional view illustrating developed light paths of Numerical Example 7 of the present invention.
Figure 15:
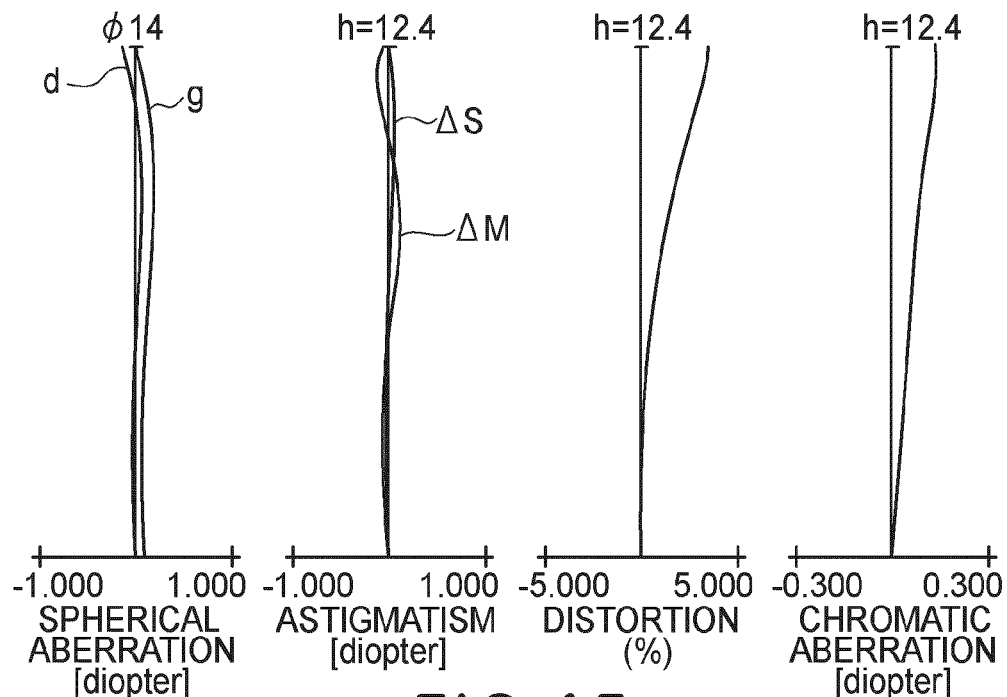
FIG. 15 is an aberration diagram of Numerical Example 7 of the present invention.

FIG. 14 and FIG. 15 are a developed light path diagram and an aberration diagram, respectively, of a finder optical system according to Embodiment 7 of the present invention.

Figure 16:
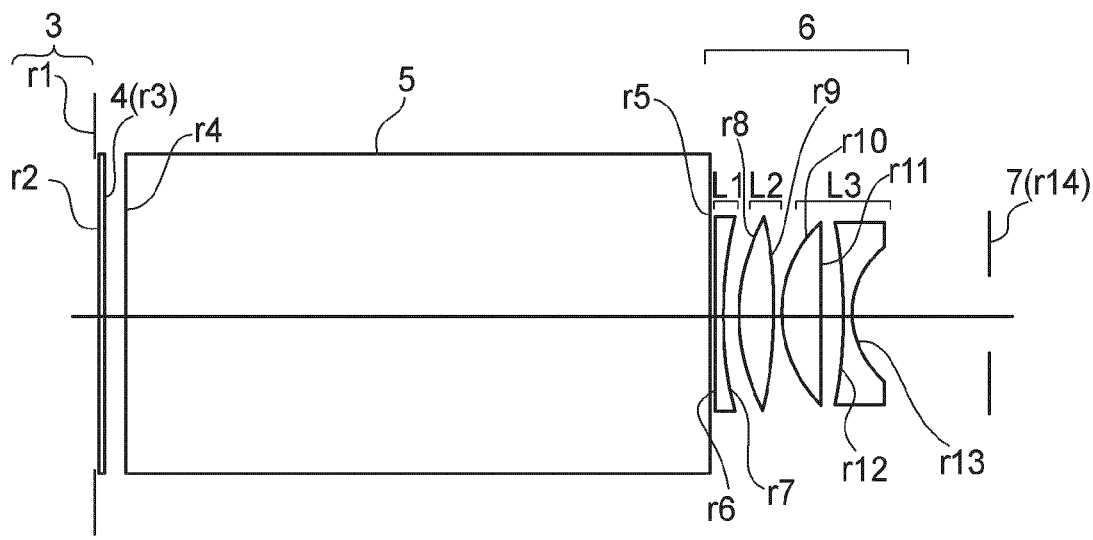
FIG. 16 is a sectional view illustrating developed light paths of Numerical Example 8 of the present invention.
Figure 17:
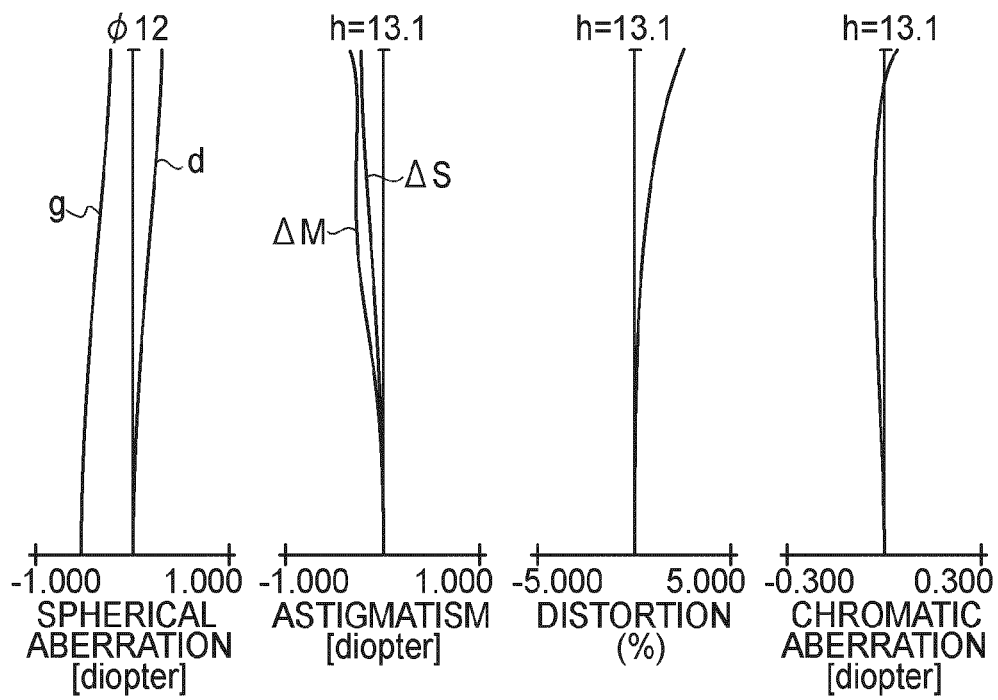
FIG. 17 is an aberration diagram of Numerical Example 8 of the present invention.

FIG. 16 and FIG. 17 are a developed light path diagram and an aberration diagram, respectively, of a finder optical system according to Embodiment 8 of the present invention.

Figure 18:
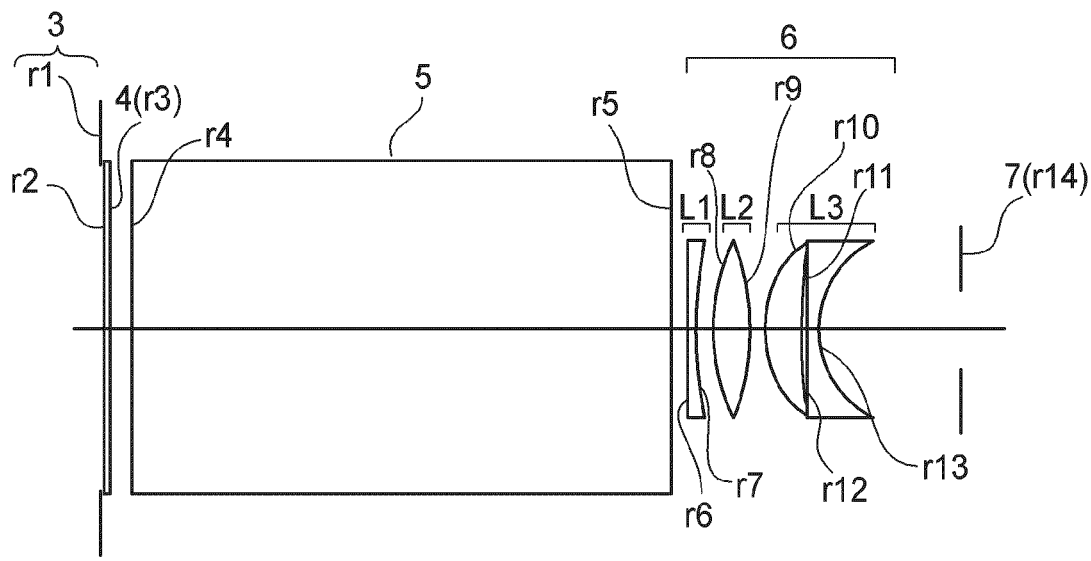
FIG. 18 is a sectional view illustrating developed light paths of Numerical Example 9 of the present invention.
Figure 19:
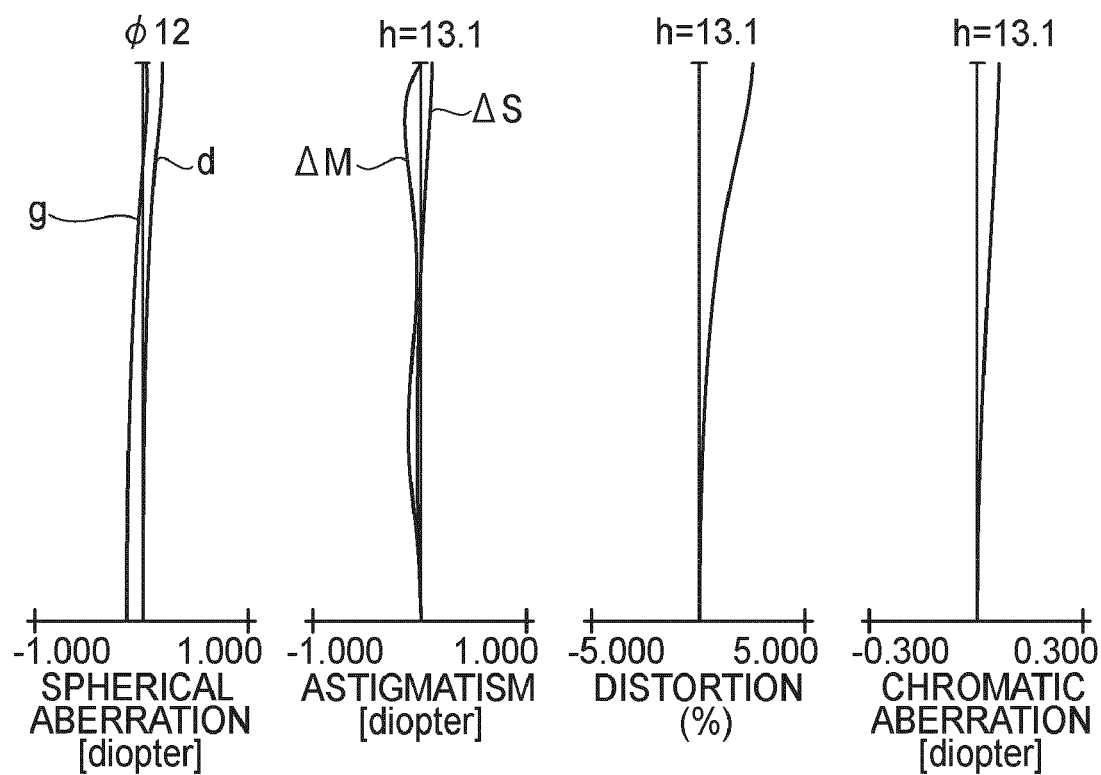
FIG. 19 is an aberration diagram of Numerical Example 9 of the present invention.

FIG. 18 and FIG. 19 are a developed light path diagram and an aberration diagram, respectively, of a finder optical system according to Embodiment 9 of the present invention.

In these light path diagrams and aberration diagrams, the finder diopter is set at −1 diopter (standard diopter).

In FIG. 1 and in the developed light path diagrams, denoted at 1 is an image taking lens which is fixed to or demountably mounted on a camera body (not shown). Denoted at 2 is a quick return mirror (QR mirror) which is pivotable around a rotational axis 2a, as depicted by an arrow 2b. It functions to reflect upwardly a light beam from the image taking lens 1. Denoted at 3 is a focusing glass (Fresnel lens). Denoted at 4 is a focusing glass (mat surface) on which a photogenic subject image (finder image) is formed by the image taking lens 1.

Denoted at 5 is penta roof prism as an erecting image forming member (image inversion means) which functions to convert the photogenic subject image on the focusing glass 4 into an erecting normal image. Denoted at 5a is the light entrance surface of the penta roof prism 5 where light beams concerning the photogenic subject image from the focusing glass 4 are incident.

Denoted at 5b is a first reflecting mirror of roof shape which constitutes the penta roof prism 5. This reflecting mirror functions to reflect the light beam, incident thereon from the light entrance surface 5a, of the photogenic subject image formed on the focusing glass 4, toward the photogenic subject image side.

Denoted at 5c is a second reflecting mirror which reflects the light beam, reflected by the first reflecting mirror 5b toward the object side, in the direction toward the observation side (eye point side).

Denoted at 5d is a light exit surface of the penta roof prism. It should be noted that, as an alternative, the erecting image forming member may be comprised of a penta roof prism or a plurality of prism elements.

Denoted at 6 is an ocular lens which constitutes a part of the finder optical system. In FIG. 1, the ocular lens 6 is schematically illustrated.

The ocular lens 6 is comprised of, in an order from the penta roof prism 5 side to the observation side, a first lens group L1 having a negative refracting power, a second lens L2 having a positive refracting power, and a third lens group L3 having a positive or negative refracting power.

By moving the second lens group L2 along the optical axis La of the ocular lens 6, the diopter adjustment (movement) is carried out. Here, each lens group consists of a single lens or a plurality of lenses.

Denoted at 7 is an eye point where the eyes of the observer are located. The distance from the final lens surface Rb of the ocular lens 6 to the eye point 7 at the observation side corresponds to the eye relief.

Denoted at IP is the image plane of the image taking lens 1, and this image plane corresponds to the image taking surface of a solid-state image pickup device (image taking means) such as a CCD sensor or a CMOS sensor, for example, or alternatively a photosensitive surface such as a film (image pickup means).

In the finder optical system of the present embodiment, a photogenic subject image formed by the image taking lens 1 is reflected with by the quick return mirror 2 and it is formed on the focusing glass 4 through a Fresnel lens 3. Then, the finder image formed on the focusing glass 4 is converted by the penta roof prism 5 into an erecting image which is then observed through the ocular lens 6 from the eye point 7.

When an image is to be formed on the image taking means, the quick return mirror 2 pivotally moves as shown by an arrow 2b so that the light beam from the image taking lens 1 can be incident on the image plane IP. Then, by the image taking means disposed at the image plane IP, an image corresponding to the photogenic subject image formed on the focusing glass 4 (i.e., an image of a portion of or the whole of the photogenic subject image or, alternatively, an image larger than it) is photoelectrically converted (received).

In the aberration diagrams, denoted by d and g are d-line and g-line, respectively. Denoted by ΔM and ΔS are a meridional image surface and a sagittal image surface of the d-line, respectively. The chromatic aberration of magnification is represented by g-line.

Denoted at ø is the pupil diameter. Denoted by h is the image height at the focusing glass 4 side.

The ocular lens 6 which constitutes the finder optical system in these embodiments comprises, as described hereinbefore, a first lens group L1 of negative refracting power, a second lens group L2 of positive refracting power for diopter movement, and third lens group including one or more positive lens and one or more negative lens and having a positive or negative overall refracting power.

The focal length of the whole system when the ocular lens is at −1 diopter is denoted by f, and the composite focal length of the negative lens of the third lens group L3 is denoted by f3n.

Here, the following conditional expression is satisfied.

$$-0.55 < f3n/f < -0.30 \quad (1)$$

By satisfying this condition in Embodiments 1-9, a large observation magnification is realized, such that a sufficient length of eye relief is accomplished while assuring a large finder image.

Here, with regard to the term "composite focal length", if the lens group consists of a single piece of lens, it refers to the focal length of that lens. If the lens group consists of plural lenses, it refers to the synthetic focal length under the condition that these lenses are placed.

Next, the technical significance of conditional expression (1) will be explained.

Conditional expression (1) relates to the refracting power of the negative lens included in the third lens group L3. In order to make the observation magnification of the finder optical system large, it is necessary to shorten the distance from the focusing glass 4 to the ocular lens 6 (i.e., the optical path length up to the principal point position of the ocular lens). To this end, the refracting power of the negative lens included in the third lens group L3 should be made large. However, if the refracting power of the negative lens included in the third lens group L3 is too strong, it becomes difficult to secure a sufficient eye relief length.

Conditional expression (1) is a condition necessary for securing the eye relief of sufficient length while realizing a large observation magnification. If the lower limit of conditional expression (1) is exceeded, the refracting power of the negative lens in the third lens group L3 becomes too weak and the principal point position of the ocular lens 6 shifts away from the focusing glass 4. Thus, it becomes difficult to realize a large observation magnification.

On the other hand, if the refracting power of the negative lens in the third lens group L3 becomes too strong beyond the upper limit of the condition, it becomes difficult to secure the eye relief of sufficient length.

More preferably, the numerical range of conditional expression (1) had better be set as follows.

$$-0.54 < f3n/f < -0.32 \quad (1a)$$

By constructing the finder optical system in Embodiments 1-9 as described above, the observation magnification can be made large while keeping high optical performance, and a large finder image can be observed, yet an eye relief of sufficient length is secured.

In Embodiments 1-9, more preferably, one or more of the following conditions had better be satisfied.

The composite focal length of the positive lens or lenses in the third lens group L3 is denoted by f3p.

The first lens group L1 is comprised of a negative eleventh lens, and the Abbe's number of the material of the eleventh lens is denoted by vd11.

The third lens group L3 is comprised of, in an order from the penta roof prism side (erecting image forming member side) to the observation side, a positive thirty-first lens and at least one negative lens. Among these, the Abbe's number of the material of at least one negative lens is denoted by vdn.

Here, one or more of the following conditional expressions had better be satisfied.

$$-1.91 < f1/f < -1.28 \quad (2)$$

$$-1.75 < f3p/f3n < -1.00 \quad (3)$$

$$vd11 < 35 \quad (4)$$

$$25 < vdn < 58 \quad (5)$$

It should be noted that, if plural negative lenses are included there, each negative lens had better satisfy conditional expression (5).

Conditional expression (2) is a condition necessary for securing the eye relief of sufficient length while realizing a large observation magnification. If the lower limit of conditional expression (2) is exceeded, the refracting power of the first lens group L1 becomes too weak, and it becomes difficult to secure a sufficient eye relief length.

On the other hand, if the refracting power of the first lens group L1 becomes too strong beyond the upper limit of the condition, the principal point position of the ocular lens 6 shifts away from the focusing glass 4, and it becomes difficult to realize a large observation magnification.

Conditional expression (3) is a condition necessary for securing the eye relief of sufficient length while realizing a large observation magnification. Conditional expression (3) represents the observation magnification of the third lens group L3, and it is condition for observing the image formed by the first and second lens groups L1 and L2 in an enlarged scale.

If the lower limit of conditional expression (3) is exceeded, the observation magnification of the third lens group L3 becomes too large and it becomes difficult to secure a sufficient eye relief length.

On the other hand, if the upper limit of the condition is exceeded, the enlarging magnification of the third lens group L3 diminishes, such that it becomes difficult to realize large observation magnification.

Conditional expressions (4) and (5) are conditions for correcting the chromatic aberration of magnification of the finder optical system. In order to perform adequate correction of the chromatic aberration of magnification caused by making the magnification larger, the dispersion of lens material having a negative refracting power should be set appropriately.

Conditional expression (4) is a condition for correcting the chromatic aberration of magnification by using a high dispersion material for the material of the eleventh lens having a negative refracting power. If the upper limit of the conditional expression (4) is surpassed, correction of the chromatic aberration of magnification becomes insufficient.

Conditional expression (5) is a condition for well correcting the chromatic aberration of magnification by using a material having an appropriate dispersion for the negative lens of the third lens group L3. If the upper limit of conditional expression (5) is surpassed, correction of the chromatic aberration of magnification becomes insufficient. Furthermore, if the lower limit of conditional expression (5) is exceeded, correction of longitudinal chromatic aberration becomes insufficient.

More preferably, the numerical range of conditional expressions (2), (3), (4) and (5) had better be set as follows.

$$-1.90 < f1/f < -1.29 \quad (2a)$$

$$-1.73 < f3p/f3n < -1.10 \quad (3a)$$

$$vd11 < 32 \quad (4a)$$

$$27.0 < vdn < 57.6 \quad (5a)$$

In accordance with Embodiments 1-9 as described above, components of the finder optical system are set appropriately by which high optical performance, large observation magnification and yet sufficient eye relief length can be accomplished.

Next, the configuration of the ocular lens of these embodiments will be explained. In these embodiments, the first lens group L1 is comprised of a negative eleventh lens having an observation side surface of concave shape. Furthermore, the second lens group L2 is comprised of a positive twenty-first lens having a biconvex shape.

In Embodiments 1-4 and Embodiments 6-9, the third lens group L3 is comprised of a positive thirty-first lens and a negative thirty-second lens. Furthermore, Embodiment 5 is comprised of, in an order from the penta roof prism 5 to the observation side, a positive thirty-first lens and two pieces of negative lenses (negative thirty-second lens and negative thirty-third lens).

Numerical examples corresponding to these embodiments will be explained below.

In the following numerical examples, the surface number is shown by the order from the focusing glass 4. Denoted at ri the curvature radius of the i-th optical element in the order from the focusing glass 4 side. Denoted at di is the i-th optical element thickness and air spacing in the order from the focusing glass 4 side. Denoted at ndi and vdi are the refractive index and Abbe's number, respectively, of the material of the i-th optical element in the order from the focusing glass 4 side.

Reference characters r1 and 2 correspond to the focusing glass 3, and reference character r3 corresponds to the focusing glass 4 (mat surface). Reference characters r4 and r5 correspond to the light entrance surface 5a and the light exit surface 5d of penta roof prism 5, respectively. The curvature radii of the surfaces r1-r5 is planar (∞).

In Numerical Example 1-4 and 6-9, r6-r13 denote the curvature radii of the lens surfaces constituting the ocular lens 6.

In Numerical Example 5, r6-r15 correspond to the curvature radii of the lens surfaces constituting the ocular lens 6.

In Numerical Example 1-9, the final surface shows the eye point (stop).

It should be noted that, in these numerical example, the symbol "*" represents that the surface is aspherical. When the X axis is taken on the optical axis direction, the Y axis is taken on a direction perpendicular to the optical axis, and the advancement direction of light is taken as positive and R is assumed by the paraxial curvature radius, K, A4, A6, A8 and A10, the aspherical shape can be defined by the following equation.

$$X = \frac{(1/R)Y^2}{1 + \sqrt{1 - (1+K)(Y/R)^2}} + A4Y^4 + A6Y^6 + A8Y^8 + A10Y^{10}$$

wherein "e-0X" refers to "10-X".

Furthermore, approximate calculation results of the finder magnification (observation magnification) and the eye relief when the finder optical system of each numerical example was accomplished are shown. The finder magnification is represented in terms of the angular magnification of an afocal system when a standard lens having a focal length 50 mm is mounted as an image taking lens. Here, it is approximately represented by the ratio between the focal length of the image taking lens and the focal length of the finder optical system.

Table 1 below shows the relationship between the aforementioned conditional expressions and the numerical values of the numerical examples.

Numerical Example 1

| Surface Data | | | | | |
|---|---|---|---|---|---|
| Number | r | d | nd | vd | Effective ø |
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 83.25 | 1.51633 | 64.1 | 50.00 |
| 5 | ∞ | 0.52 | | | 25.00 |
| 6 | -668.731 | 1.75 | 1.58306 | 30.2 | 24.00 |
| 7* | 54.163 | (variable) | | | 24.00 |
| 8* | 26.782 | 4.68 | 1.52470 | 56.2 | 24.00 |
| 9 | -91.305 | (variable) | | | 24.00 |
| 10* | 19.444 | 5.34 | 1.52470 | 56.2 | 24.00 |
| 11 | -72.745 | 3.60 | | | 24.00 |
| 12* | -57.942 | 2.00 | 1.49171 | 57.4 | 24.00 |
| 13 | 13.758 | 22.00 | | | 17.00 |
| 14(stop) | ∞ | | | | 10.00 |

| Aspherical Surfaced Data |
|---|
| 7th Surface |
| K = 2.57764e+000, A4 = 1.28915e-006, A6 = -1.26118e-008 |
| A8 = -2.55424e-010, A10 = 1.04289e-012 |
| 8th Surface |
| K = -1.03529e+000, A4 = 1.90417e-005, A6 = -1.04443e-007 |
| A8 = 5.92133e-012, A10 = 6.92071e-013 |
| 10th Surface |
| K = 9.03262e-001, A4 = -4.21397e-005, A6 = -3.83091e-008 |
| A8 = -1.75950e-011, A10 = -3.99358e-012 |
| 12th Surface |
| K = -9.33807e+000, A4 = 1.88814e-007, A6 = 1.25533e-007 |
| A8 = -5.13665e-010, A10 = -1.27776e-012 |

| Diopter | -1.0 | -3.0 | +1.0 |
|---|---|---|---|
| Focal length | 52.10 | 54.15 | 50.27 |
| Variable Spacing | | | |
| d7 | 2.56 | 0.70 | 4.35 |
| d9 | 1.55 | 4.01 | 0.70 |

Eye relief: 22.0 mm
Maximum Image Height: 13.1 mm
Pupil Diameter: ø10
Observation Magnification: (at -1 diopter) 0.96

Numerical Example 2

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 83.25 | 1.51633 | 64.1 | 50.00 |
| 5 | ∞ | 0.51 | | | 25.00 |
| 6 | −1074.933 | 1.75 | 1.58306 | 30.2 | 24.00 |
| 7* | 58.939 | (variable) | | | 24.00 |
| 8* | 27.128 | 4.67 | 1.52470 | 56.2 | 24.00 |
| 9 | −98.388 | (variable) | | | 24.00 |
| 10* | 19.469 | 5.00 | 1.52470 | 56.2 | 24.00 |
| 11 | −77.618 | 3.67 | | | 24.00 |
| 12 | −98.169 | 2.01 | 1.60342 | 38.0 | 24.00 |
| 13 | 15.832 | 22.00 | | | 17.00 |
| 14(stop) | ∞ | | | | 10.00 |

Aspherical Surface Data

7th Surface $K = 2.79002e+000, A4 = 4.38192e-006, A6 = -1.98995e-008$
$A8 = -2.54909e-010, A10 = 1.13055e-012$ 8th Surface $K = -7.94546e-001, A4 = 1.98507e-005, A6 = -1.01573e-007$
$A8 = 5.32702e-012, A10 = 6.82690e-013$ 10th Surface $K = 9.00220e-001, A4 = -4.21880e-005, A6 = -3.52646e-008$
$A8 = 3.68260e-011, A10 = -4.07149e-012$

| Diopter | −1.0 | −3.0 | +1.0 |
|---|---|---|---|
| Focal length | 52.09 | 53.94 | 50.27 |
| d7 | 2.72 | 0.70 | 4.68 |
| d9 | 1.66 | 4.00 | 0.70 |

Eye relief: 22.0 mm
Maximum Image Height: 13.1 mm
Pupil Diameter: ø10
Observation Magnification: (at −1 diopter) 0.96

Numerical Example 3

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 82.84 | 1.51633 | 64.1 | 50.00 |
| 5 | ∞ | 0.50 | | | 25.00 |
| 6 | ∞ | 1.75 | 1.58306 | 30.2 | 25.00 |
| 7* | 44.429 | (variable) | | | 25.00 |
| 8* | 28.931 | 4.50 | 1.52470 | 56.2 | 25.00 |
| 9 | −47.741 | (variable) | | | 25.00 |
| 10* | 19.186 | 5.37 | 1.52470 | 56.2 | 25.00 |
| 11 | −122.201 | 3.02 | | | 25.00 |
| 12 | −314.833 | 2.15 | 1.64769 | 33.8 | 25.00 |
| 13 | 15.281 | 22.00 | | | 17.00 |
| 14(stop) | ∞ | | | | 12.00 |

Aspherical Surface Data

7th Surface $K = 4.46726e+000, A4 = -1.01470e-005, A6 = 2.02087e-009$
$A8 = -2.74473e-010, A10 = 2.55254e-013$ 8th Surface $K = -1.03105e+001, A4 = 3.28785e-005, A6 = -1.86356e-007$
$A8 = 5.74535e-010, A10 = -1.52724e-012$ 10th Surface $K = -5.02569e-001, A4 = 1.16932e-005, A6 = -1.38784e-008$
$A8 = 5.27327e-011, A10 = 1.05579e-012$

| Diopter | −1.0 | −3.0 | +1.0 |
|---|---|---|---|
| Focal length | 52.09 | 54.02 | 50.35 |
| d7 | 2.37 | 0.70 | 4.01 |
| d9 | 2.25 | 4.00 | 0.50 |

Eye relief: 22.0 mm
Maximum Image Height: 13.1 mm
Pupil Diameter: ø12
Observation Magnification: (at −1 diopter) 0.96

Numerical Example 4

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 81.44 | 1.51633 | 64.1 | 50.00 |
| 5 | ∞ | 0.50 | | | 25.00 |
| 6 | −784.851 | 1.89 | 1.78472 | 25.7 | 22.00 |
| 7* | 68.609 | (variable) | | | 22.00 |
| 8* | 28.846 | 5.00 | 1.52470 | 56.2 | 22.00 |
| 9 | −35.502 | (variable) | | | 22.00 |
| 10* | 19.087 | 5.46 | 1.52470 | 56.2 | 22.00 |
| 11 | −276.864 | 2.34 | | | 22.00 |
| 12 | −52.358 | 2.00 | 1.57099 | 50.8 | 20.00 |
| 13 | 15.896 | 22.00 | | | 16.00 |
| 14(stop) | ∞ | | | | 14.00 |

Aspherical Surface Data

7th Surface $K = 6.36836e+000, A4 = -3.06435e-006, A6 = -2.36442e-007$
$A8 = 3.31369e-009, A10 = -1.11895e-011$ 8th Surface $K = 3.57007e+000, A4 = -3.06375e-005, A6 = -4.74601e-007$
$A8 = 5.44906e-009, A10 = -2.15842e-011$ 10th Surface $K = 1.04379e+000, A4 = -1.83099e-005, A6 = 1.89658e-007$
$A8 = -3.45695e-009, A10 = 5.85322e-012$

| Diopter | −1.0 | −3.0 | +1.0 |
|---|---|---|---|
| Focal length | 51.33 | 52.51 | 50.22 |
| d7 | 2.48 | 0.70 | 4.30 |
| d9 | 2.32 | 4.10 | 0.50 |

Eye relief: 22.0 mm
Maximum Image Height: 12.4 mm
Pupil Diameter: ø14
Observation Magnification: (at −1 diopter) 0.97

Numerical Example 5

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 84.53 | 1.51633 | 64.1 | 50.00 |
| 5 | ∞ | 0.90 | | | 25.00 |
| 6 | −155.465 | 1.75 | 1.58306 | 30.2 | 24.00 |
| 7* | 53.653 | (variable) | | | 24.00 |
| 8* | 27.744 | 4.94 | 1.52470 | 56.2 | 24.00 |
| 9 | −38.038 | (variable) | | | 24.00 |
| 10* | 24.368 | 5.70 | 1.52470 | 56.2 | 24.00 |
| 11 | −60.857 | 1.64 | | | 24.00 |
| 12 | −97.437 | 1.82 | 1.58306 | 30.2 | 24.00 |
| 13 | 60.000 | 1.73 | | | 24.00 |
| 14 | ∞ | 2.50 | 1.49171 | 57.4 | 24.00 |
| 15 | 16.782 | 22.00 | | | 17.00 |
| 16(stop) | ∞ | | | | 10.00 |

Aspherical Surface Data

7th Surface

K = 6.22533e+000, A4 = 8.19944e−007, A6 = −2.20569e−007
A8 = 1.71777e−010, A10 = 2.06967e−012

8th Surface

K = 9.12674e−001, A4 = −1.62878e−005, A6 = −2.56717e−007
A8 = −2.36385e−010, A10 = 3.61096e−012

10th Surface

K = 1.38490e+000, A4 = −1.32981e−005, A6 = 2.01450e−008
A8 = 1.54281e−009, A10 = −8.54007e−012

| Diopter | −1.0 | −3.0 | +1.0 |
|---|---|---|---|
| Focal length | 52.43 | 54.51 | 50.70 |
| d7 | 2.44 | 0.70 | 4.04 |
| d9 | 2.28 | 4.00 | 0.70 |

Eye relief: 22.0 mm
Maximum Image Height: 13.1 mm
Pupil Diameter: ø10
Observation Magnification: (at −1 diopter) 0.96

Numerical Example 6

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 83.80 | 1.65844 | 50.9 | 50.00 |
| 5 | ∞ | 0.69 | | | 25.00 |
| 6 | −278.467 | 1.75 | 1.58306 | 30.2 | 24.00 |
| 7* | 48.037 | (variable) | | | 24.00 |
| 8* | 28.487 | 4.72 | 1.52470 | 56.2 | 24.00 |
| 9 | −115.198 | (variable) | | | 24.00 |
| 10* | 18.138 | 5.25 | 1.52470 | 56.2 | 24.00 |
| 11 | −43.017 | 2.92 | | | 24.00 |
| 12* | −58.747 | 2.97 | 1.49171 | 57.4 | 24.00 |
| 13 | 13.398 | 22.00 | | | 17.00 |
| 14(stop) | ∞ | | | | 10.00 |

Aspherical Surface Data

7th Surface

K = 6.36602e+000, A4 = 8.23819e−007, A6 = −1.77750e−007
A8 = 6.76616e−010, A10 = −1.56161e−012

8th Surface

K = −1.26111e+000, A4 = 1.03583e−005, A6 = −1.41272e−007
A8 = 6.62637e−011, A10 = 1.78319e−013

10th Surface

K = 1.56975e−001, A4 = −2.45955e−005, A6 = −4.59917e−008
A8 = 2.91860e−010, A10 = −2.25989e−012

12th Surface

K = 1.16956e+001, A4 = 8.15840e−006, A6 = −1.21407e−008
A8 = 1.10325e−009, A10 = −2.98027e−012

| Diopter | −1.0 | −3.0 | +1.0 |
|---|---|---|---|
| Focal length | 51.11 | 54.08 | 48.73 |
| d7 | 2.56 | 0.70 | 4.19 |
| d9 | 2.14 | 4.00 | 0.51 |

Eye relief: 22.0 mm
Maximum Image Height: 13.1 mm
Pupil Diameter: ø10
Observation Magnification: (at −1 diopter) 0.98

Numerical Example 7

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 81.44 | 1.51633 | 64.1 | 50.00 |
| 5 | ∞ | 0.50 | | | 25.00 |
| 6 | −784.851 | 1.75 | 1.78472 | 25.7 | 22.00 |
| 7* | 64.053 | (variable) | | | 22.00 |
| 8* | 29.156 | 5.00 | 1.52470 | 56.2 | 22.00 |
| 9 | −33.821 | (variable) | | | 22.00 |
| 10* | 19.480 | 5.45 | 1.52470 | 56.2 | 22.00 |
| 11 | −403.070 | 2.59 | | | 22.00 |
| 12 | −39.534 | 2.00 | 1.49171 | 57.4 | 20.00 |
| 13 | 15.023 | 22.00 | | | 16.00 |
| 14(stop) | ∞ | | | | 14.00 |

Aspherical Surface Data

7th Surface

K = 6.96037e+000, A4 = −8.33537e−007, A6 = −2.76983e−007
A8 = 3.16395e−009, A10 = −9.94943e−012

8th Surface

K = 3.32658e+000, A4 = −2.96857e−005, A6 = −4.47945e−007
A8 = 4.50476e−009, A10 = −1.61645e−011

10th Surface

K = 1.13589e+000, A4 = −1.20274e−005, A6 = 1.43817e−007
A8 = −2.31785e−009, A10 = 2.35917e−012

| Diopter | −1.0 | −3.0 | +1.0 |
|---|---|---|---|
| Focal length | 51.33 | 52.67 | 50.07 |
| d7 | 2.38 | 0.70 | 4.10 |
| d9 | 2.32 | 4.00 | 0.60 |

Eye relief: 22.0 mm
Maximum Image Height: 12.4 mm
Pupil Diameter: ø14
Observation Magnification: (at −1 diopter) 0.97

Numerical Example 8

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 93.35 | 1.65844 | 50.9 | 50.00 |
| 5 | ∞ | 0.49 | | | 30.00 |
| 6 | ∞ | 1.47 | 1.84666 | 23.8 | 30.00 |
| 7 | 72.678 | (variable) | | | 30.00 |
| 8* | 30.704 | 5.60 | 1.65160 | 58.5 | 30.00 |
| 9 | −73.148 | (variable) | | | 30.00 |
| 10 | 19.522 | 6.02 | 1.77250 | 49.6 | 28.00 |
| 11 | 254.087 | 3.73 | | | 28.00 |
| 12 | −89.011 | 1.69 | 1.72825 | 28.5 | 28.00 |
| 13 | 13.364 | 22.0 | | | 20.00 |
| 14 (stop) | ∞ | | | | 12.00 |

Aspherical Surface Data
8th Surface

K = 9.69483e−001, A4 = −1.06144e−005, A6 = −8.90915e−009
A8 = 7.87746e−012, A10 = −9.02678e−014

| Diopter | −1.0 | −3.0 | +1.0 |
|---|---|---|---|
| Focal length | 45.48 | 46.47 | 44.47 |
| d7 | 2.38 | 0.70 | 3.76 |
| d9 | 1.12 | 3.31 | 0.25 |

Eye relief: 22.0 mm
Maximum Image Height: 13.1 mm
Pupil Diameter: ø12
Observation Magnification: (at −1 diopter) 1.10

-continued

| | | | | | |
|---|---|---|---|---|---|
| 11 | 105.925 | 0.82 | | | 26.00 |
| 12 | −4622.353 | 1.85 | 1.57501 | 41.5 | 26.00 |
| 13 | 15.224 | 22.0 | | | 26.00 |
| 14 (stop) | ∞ | | | | 12.00 |

Aspherical Surface Data

7th Surface

K = 6.96037e+000, A4 = −8.33537e−007, A6 = −2.76983e−007
A8 = 3.16395e−009, A10 = −9.94943e−012

8th Surface

K = 2.49502e+000, A4 = −3.26642e−005, A6 = −4.09540e−007
A8 = 4.05312e−009, A10 = −1.39299e−011

10th Surface

K = 1.13589e+000, A4 = −1.20274e−005, A6 = 1.43817e−007
A8 = −2.31785e−009, A10 = 2.35917e−012

| d7 | 2.58 | 0.70 | 4.49 | 3.52 |
|---|---|---|---|---|
| d9 | 2.21 | 4.60 | 0.50 | 1.35 |

| Diopter | −1.0 | −3.0 | +1.0 |
|---|---|---|---|
| Focal length | 49.88 | 50.46 | 48.97 |
| d7 | 2.58 | 0.70 | 4.49 |
| d9 | 2.21 | 4.60 | 0.50 |

Eye relief: 22.0 mm
Maximum Image Height: 13.1 mm
Pupil Diameter: ø10
Observation Magnification: (at −1 diopter) 1.00

TABLE 1

| | Conditional Expression (1) | Conditional Expression (2) | Conditional Expression (3) | Conditional Expression (4) | Conditional Expression (5) |
|---|---|---|---|---|---|
| Numerical Example 1 | −0.43 | −1.65 | −1.33 | 30.2 | 57.4 |
| Numerical Example 2 | −0.43 | −1.84 | −1.35 | 30.2 | 38 |
| Numerical Example 3 | −0.43 | −1.46 | −1.43 | 30.2 | 33.8 |
| Numerical Example 4 | −0.41 | −1.56 | −1.62 | 25.7 | 50.8 |
| Numerical Example 5 | −0.47 | −1.30 | −1.39 | 30.2 | 30.2/57.4 |
| Numerical Example 6 | −0.43 | −1.37 | −1.14 | 30.2 | 57.4 |
| Numerical Example 7 | −0.43 | −1.47 | −1.63 | 25.7 | 57.4 |
| Numerical Example 8 | −0.35 | −1.89 | −1.71 | 23.8 | 28.5 |
| Numerical Example 9 | −0.53 | −1.64 | −1.69 | 25.7 | 41.5 |

Numerical Example 9

Surface Data

| Number | r | d | nd | vd | Effective ø |
|---|---|---|---|---|---|
| 1 | ∞ | 0.60 | | | 50.00 |
| 2 | ∞ | 1.00 | 1.58306 | 30.2 | 50.00 |
| 3 | ∞ | 3.30 | | | 50.00 |
| 4 | ∞ | 82.50 | 1.77250 | 49.6 | 50.00 |
| 5 | ∞ | 2.27 | | | 30.00 |
| 6 | ∞ | 1.50 | 1.78472 | 25.7 | 26.00 |
| 7* | 64.053 | (variable) | | | 26.00 |
| 8* | 27.444 | 5.68 | 1.56000 | 56.2 | 26.00 |
| 9 | −37.018 | (variable) | | | 26.00 |
| 10* | 19.480 | 5.59 | 1.52470 | 56.2 | 26.00 |

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-122934 filed May 9, 2008, for which is hereby incorporated by reference.

What is claimed is:

1. A finder optical system comprising:
   an erecting image forming member configured to convert a subject image formed by an image taking lens into an erecting image, and
   an ocular lens configured to enable observation the erecting image of the subject image therethrough,
   wherein said ocular lens includes, in an order from said erecting image forming member side to the observation side, a first lens group of negative refracting power, a second lens group of positive refracting power and configured to move in an optical axis direction to perform diopter adjustment, and a third lens group having at least one positive lens and at least one negative lens and having a positive or negative overall refracting power, and wherein, when a focal length of the finder optical system as said ocular lens is at −1 diopter is denoted by f, a composite focal length of the negative lens or lenses of said third lens group is denoted by f3n, a conditional expression $-0.55 < f3n/f < -0.30$ is satisfied.

2. A finder optical system as claimed in claim 1, wherein, when the focal length of said first lens group is denoted by f1, a conditional expression $-1.91 < f1/f < -1.28$ is satisfied.

3. A finder optical system as claimed in claim 1, wherein, when a composite focal length of the positive lens of said third lens group is denoted by f3p, a conditional expression $-1.75 < f3p/f3n < -1.00$ is satisfied.

4. A finder optical system as claimed in claim 1, wherein said first lens group is comprised of a negative lens and, when an Abbe's number of a material of the negative lens is denoted by vd11, a conditional expression $vd11 < 35$ is satisfied.

5. A finder optical system as claimed in claim 1, wherein said third lens group is comprised of, in an order from the erecting image forming member side to the observation side, a positive lens and at least one negative lens and, when an Abbe's number of a material of the at least one negative lens is denoted by vdn, a conditional expression $25 < vdn < 58$ is satisfied.

6. A finder optical system as claimed in claim 1, wherein said third lens group is comprised of, in an order from the erecting image forming member side to the observation side, a positive lens and a negative lens, or a positive lens and two pieces of negative lenses.

7. An image pickup apparatus comprising:
a finder optical system as recited in claim 1; and
an image pickup element configured to receive an image corresponding to the subject image displayed through said finder optical system.

* * * * *